Feb. 14, 1967 G. J. PAGLUICA 3,304,053
BALANCING WEIGHTS FOR A MULTISTAGE FLUID MOTOR
Filed April 12, 1965
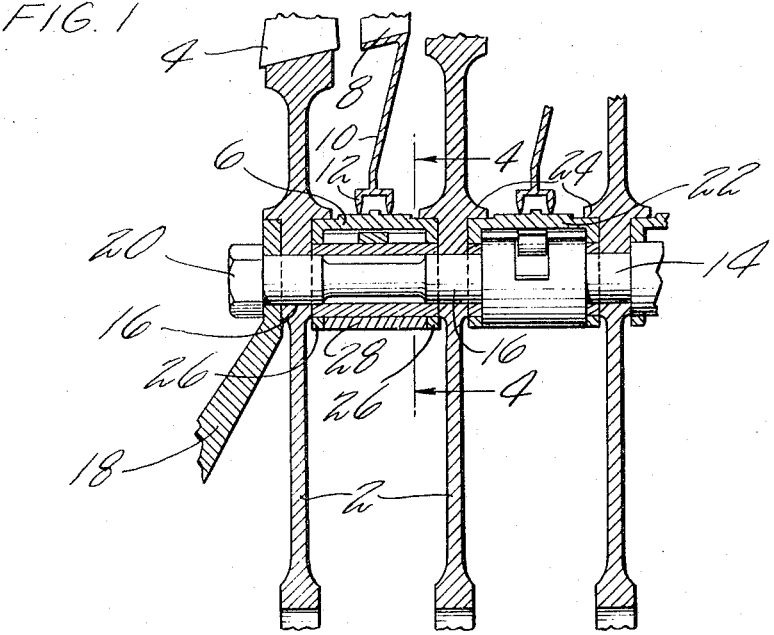
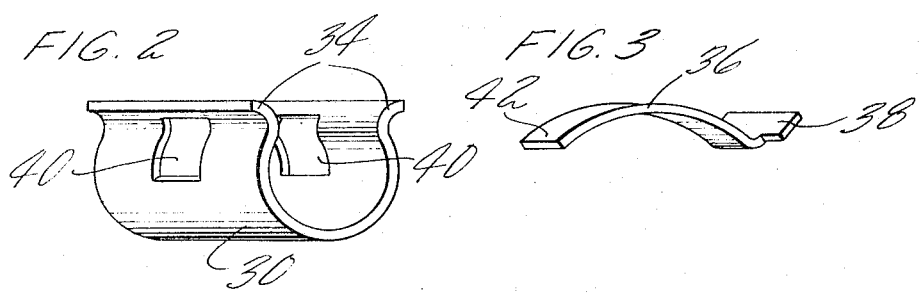
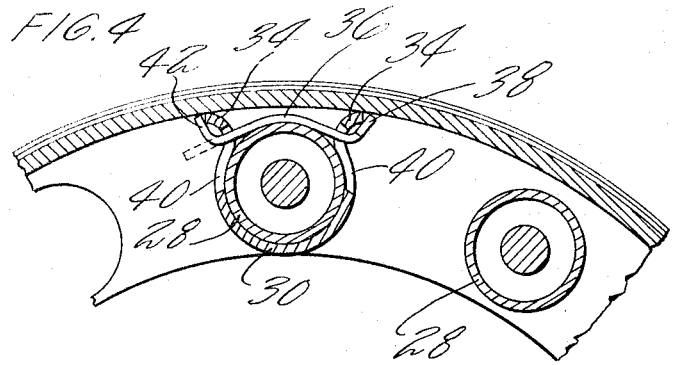
INVENTOR
GINO J. PAGLUICA
BY Charles G Warren
ATTORNEY

United States Patent Office 3,304,053
Patented Feb. 14, 1967

3,304,053
BALANCING WEIGHTS FOR A MULTISTAGE
FLUID MOTOR
Gino J. Pagluica, Manchester, Conn., assignor to United
Aircraft Corporation, East Hartford, Conn., a corporation of Delaware
Filed Apr. 12, 1965, Ser. No. 447,242
9 Claims. (Cl. 253—39)

The present invention relates to a balancing device for use on multistage rotors for compressors or turbines.

In high speed rotors used, for example, in gas turbine engines, any unbalance causes undesirable vibration, and in most instances the rotors are carefully balanced prior to use. Where the rotor is highly stressed there are few places where mass can be added or removed for balancing. A feature of the invention is a device which can be readily added to an assembled rotor at selected locations and of such mass as to balance the rotor both static and dynamically.

One feature of the invention is a balancing device that will remain in position when assembled and which is not subject to disengagement when the rotor is turning. Another feature is a balancing weight which fits securely within the rotor and which can readily be positioned to provide the necessary balancing action.

Other features and advantages will be apparent from the specification and claims, and from the accompanying drawing which illustrates an embodiment of the invention.

FIG. 1 is a fragmentary sectional view through a portion of the rotor.

FIG. 2 is a perspective view of the balancing weight of FIG. 1.

FIG. 3 is a perspective view of the locking element.

FIG. 4 is a sectional view along the line 4—4 of FIG. 1.

The invention is shown in a rotor construction for use in a gas turbine powerplant and the particular rotor construction is similar to that shown in the Ledwith Patent No. 2,639,885. It will be understood that the invention is equally applicable to a multistage turbine rotor. The compressor rotor includes a plurality of discs 2 each having a row of blades 4 on its periphery. The discs are spaced apart by spacing devices 6 such that the stator vanes 8 of the compressor stator may be positioned between adjacent rows of blades and the diaphragm 10 extending inwardly from the stator vanes 8 carries a diaphragm seal 12 cooperating with the stator device.

The discs which are in axial alignment are clamped in proper relation to each other by a row of through bolts 14 arranged in a ring around the axis of the discs and extending in aligned openings 16 in the discs. The bolts may also clamp an end bell 18 which provides a journal, not shown, for the end of the rotor. A clamping nut 20 is shown on the end of the bolt 14.

The spacing device 6 includes a sleeve 22 substantially as wide as the space between the discs where the sleeve is positioned and the diameter of this sleeve is such that it just fits inside cylindrical flanges 24 on opposite sides of each of the discs. The sleeve has integral inwardly extending flanges 26 extending parallel and adjacent to the planes of the discs and these flanges support spacer tubes 28 surrounding the through bolts and in contact with the adjacent discs thereby determining the spacing of the discs. The balancing device for use on this rotor is in the form of a spring clamp 30 substantially U-shaped in cross section and made resilient enough to fit over the sleeve 28 with the legs of the U extending outwardly from the axis of rotation of the disc. The legs of the U extend toward each other above or radially outwardly of a diametral plane 32 passing through the sleeve so that the resiliency of the clip will retain the latter in position on the sleeve. The outer ends of the legs of the U are bent away from each other to form flanges 34 in a position to engage with the spacer sleeve 22 thereby preventing this clip from turning on the tube 28. Since the clip is in the position shown, it will be apparent that centrifugal force will retain the clip in position although, if desired, a locking strip 36 may be provided. This strip has a transverse bar at one end and the strip extends through opposed openings 40 in the legs of the clip, the free end 42 of the locking strip being bent outwardly thereby to retain the locking strip in place. Obviously, the central portion of the locking strip engages on the side of the tube 28 remote from the central portion of the clip and serves to further secure the clip in position. As shown, the clip extends axially of the tube 28 into substantial engagement with the flanges 26 so that the clip will not move axially during operation.

Since the radius of the circle of bolts 20 is known, it will be apparent that if the unbalance of the rotor is determined weight of the clip 30 may be adjusted to give the necessary weight in ounces to provide the required inch-ounces of balance to correct the existing unbalance of the rotor. This may be done, for example, by shortening the clip for all or a part of its periphery. By selecting the proper mass for each clip and its location peripherally of the rotor, the diametric and static balance of the rotor may be obtained. Although two balancing clips are shown in FIG. 1, it will be apparent that one or more of these clips may be utilized depending upon the location and extent of the existing unbalance.

It is to be understood that the invention is not limited to the specific embodiment herein illustrated and described, but may be used in other ways without departure from its spirit as defined by the following claims.

I claim:

1. In a rotor construction for a multistage compressor or turbine including a plurality of discs, spacing means between the discs for holding them in spaced relation, and a row of bolts arranged in a ring around the axis of the discs and extending through the discs to hold them together, the combination of a weight in the form of an arcuate clip positioned over one of the bolts between adjacent discs, said clip being substantially the same length as the spacing between the discs and having flanges thereon for engagement with the spacing means.

2. A rotor construction as in claim 1 in which a locking strip extends between the flanges to hold the clip in position.

3. A rotor construction as in claim 1 in which the spacing means includes a ring extending between adjacent discs and the flanges on the clip engage said ring.

4. A rotor construction as in claim 3 in which the spacing means also includes sleeves surrounding the bolts and the arcuate clip surrounds and engages with the sleeve surrounding the bolt on which the clip is positioned.

5. A rotor construction as in claim 4 in which the clip has slots therein adjacent the flanges and a locking strip extends through the slots to lock the clip on the sleeve.

6. A rotor construction for a multistage compressor or turbine including a plurality of discs in axial alignment, a ring of bolts extending through the discs and holding them in assembled relation, spacing means for holding the discs in spaced relation including a sleeve surrounding each of the bolts and positioned between adjacent discs and in contact with them, in combination with balancing means comprising a substantially U-shaped spring clip fitting over one of the sleeves with the ends of the clip extending radially outward.

7. A rotor construction as in claim 6 in which the clip is slotted adjacent the ends of the U, and a locking strip extends through the slots to retain the clip in position.

8. A rotor construction as in claim 6 in which a large diameter sleeve surrounds the ring of bolts and the sleeves thereon, and the ends of the clip are in contact with the sleeve.

9. A rotor construction as in claim 8 in which the clip is substantially the length of the sleeve for engagement with the adjacent discs.

References Cited by the Examiner
UNITED STATES PATENTS

| | | | |
|---|---|---|---|
| 2,798,383 | 7/1957 | Van Cleave | 74—573 |
| 3,056,631 | 10/1962 | Mills | 74—573 X |

FOREIGN PATENTS

| | | |
|---|---|---|
| 163,871 | 6/1953 | Australia. |
| 805,371 | 12/1958 | Great Britain. |

MARTIN P. SCHWADRON, *Primary Examiner.*

E. A. POWELL, JR., *Assistant Examiner.*